United States Patent
Fukunaga

(10) Patent No.: US 12,491,602 B2
(45) Date of Patent: Dec. 9, 2025

(54) SUBSTRATE PROCESSING APPARATUS, POLISHING PAD INSPECTING DEVICE, AND METHOD FOR INSPECTING POLISHING PAD

(71) Applicant: Tokyo Electron Limited, Tokyo (JP)

(72) Inventor: Tsutomu Fukunaga, Kumamoto (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 795 days.

(21) Appl. No.: 17/678,400

(22) Filed: Feb. 23, 2022

(65) Prior Publication Data

US 2022/0281051 A1 Sep. 8, 2022

(30) Foreign Application Priority Data

Mar. 4, 2021 (JP) .................................. 2021-034270

(51) Int. Cl.
| | |
|---|---|
| *B24B 53/017* | (2012.01) |
| *B24B 37/005* | (2012.01) |
| *G06T 7/00* | (2017.01) |
| *H04N 23/56* | (2023.01) |
| *H01L 21/02* | (2006.01) |
| *H01L 21/306* | (2006.01) |

(52) U.S. Cl.
CPC .......... *B24B 37/005* (2013.01); *B24B 53/017* (2013.01); *G06T 7/0004* (2013.01); *H04N 23/56* (2023.01); *G06T 2207/20076* (2013.01); *H01L 21/02057* (2013.01); *H01L 21/30625* (2013.01)

(58) Field of Classification Search
CPC ....... B24B 37/005; B24B 49/12; B24B 49/14; B24B 55/06; G06T 7/0004; G06T 2207/20076; H04N 23/56; H01L 21/02057; H01L 21/30625; H01L 21/304; H01L 21/67092; H01L 21/67288; G01N 21/8806; G01N 21/8851; G01N 2021/8887; G01N 2201/06146; G01J 1/42; G01J 3/50
USPC .................................................. 382/100, 152
See application file for complete search history.

(56) References Cited

U.S. PATENT DOCUMENTS

| | | | |
|---|---|---|---|
| 7,027,640 B2 * | 4/2006 | Park | ....................... G01N 21/94 382/152 |
| 2007/0020918 A1 * | 1/2007 | Hirokawa | ................ B23H 5/08 438/626 |

FOREIGN PATENT DOCUMENTS

| | | |
|---|---|---|
| JP | 2019-029470 A | 2/2019 |
| JP | 2019-029472 A | 2/2019 |
| JP | 2019-034400 A | 3/2019 |

* cited by examiner

*Primary Examiner* — Sheela C Chawan
(74) *Attorney, Agent, or Firm* — Venjuris, P.C.

(57) ABSTRACT

A substrate processing apparatus includes: a polishing pad that polishes a substrate; a pod that accommodates a polishing surface of the polishing pad, which is brought into contact with the substrate; an imaging unit that images the polishing surface of the polishing pad through the pod; and an image processing unit that processes image data imaged by the imaging unit to detect deterioration of the polishing pad.

15 Claims, 9 Drawing Sheets

SUBSTRATE PROCESSING APPARATUS, POLISHING PAD INSPECTING DEVICE, AND METHOD FOR INSPECTING POLISHING PAD

CROSS-REFERENCE TO RELATED APPLICATIONS

This application is based on and claims priority from Japanese Patent Application No. 2021-034270 filed on Mar. 4, 2021 with the Japan Patent Office, the disclosure of which is incorporated herein in its entirety by reference.

TECHNICAL FIELD

The present disclosure relates to a substrate processing apparatus, a polishing pad inspecting device, and a method for inspecting a polishing pad.

BACKGROUND

A substrate processing apparatus disclosed in Japanese Patent Laid-Open Publication No. 2019-029470 includes an inspection tool that inspects deterioration of a part of the substrate processing apparatus. The inspection tool includes an imaging device that acquires image data of a part, a color information acquiring device that acquires color information of the part, which is an inspection target, from the image data acquired by the imaging device, and a deterioration determination unit that determines the degree of the deterioration of the inspection target part based on the acquired color information.

A substrate processing apparatus disclosed in Japanese Patent Laid-Open Publication No. 2019-029472 includes an inspecting device that inspects deterioration of a part coated with a first resin, and an early deterioration part coated with a second resin that is more easily deteriorated than the first resin. The inspecting device determines the degree of deterioration of the part coated with the first resin by detecting the deterioration of the second resin coating.

SUMMARY

A substrate processing apparatus according to an aspect of the present disclosure includes: a polishing pad that polishes a substrate; a pod that accommodates a polishing surface of the polishing pad, which is brought into contact with the substrate; an imaging unit that images the polishing surface of the polishing pad through the pod; and an image processing unit that processes image data imaged by the imaging unit, and detect deterioration of the polishing pad.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
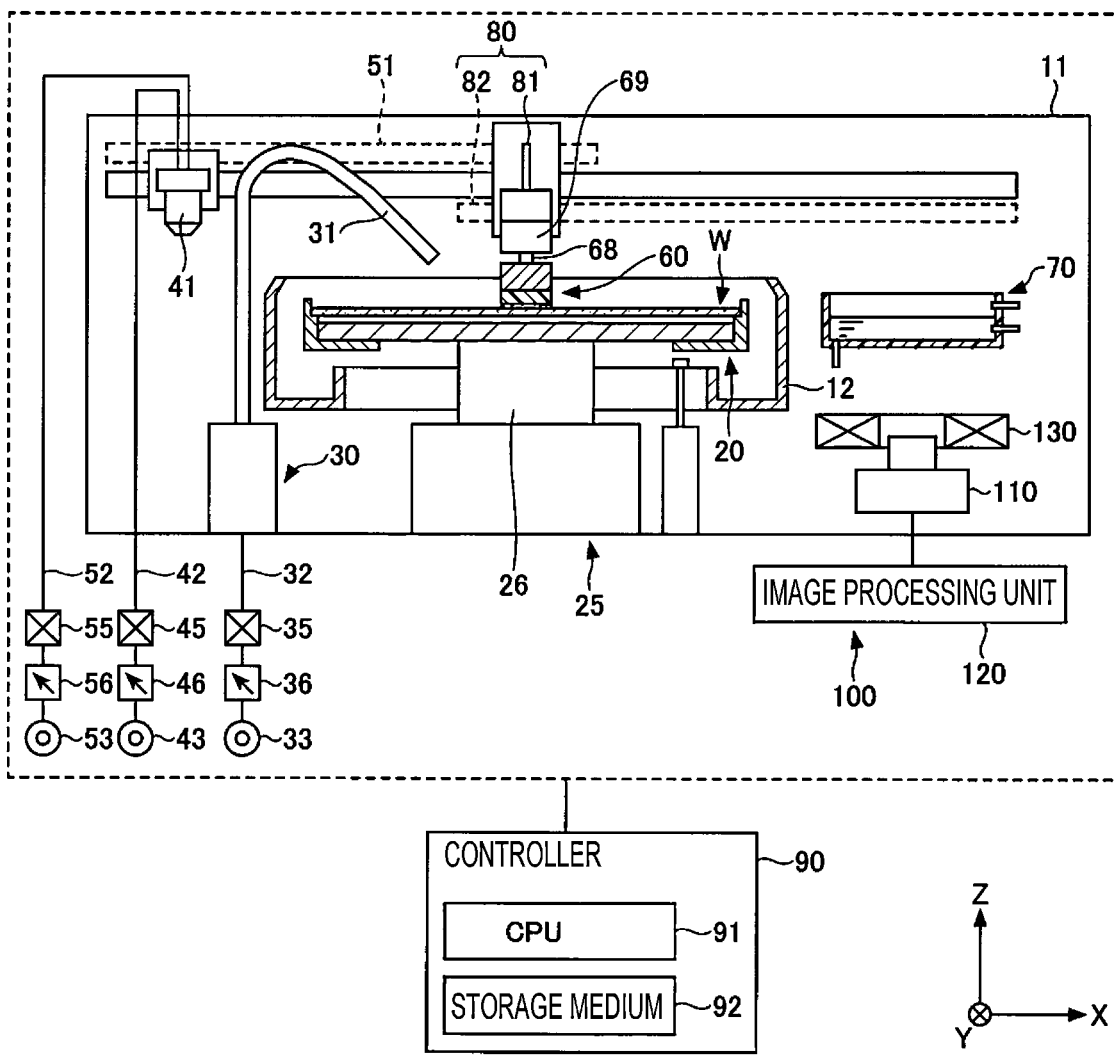
FIG. 1 is a cross-sectional view illustrating a state of a substrate processing apparatus according to an embodiment at the time of polishing.

In the following detailed description, reference is made to the accompanying drawings, which form a part hereof. The illustrative embodiments described in the detailed description, drawings, and claims are not meant to be limiting. Other embodiments may be utilized, and other changes may be made without departing from the spirit or scope of the subject matter presented here.

Hereinafter, an embodiment of the present disclosure will be described with reference to the drawings. In each drawing, similar or corresponding components will be denoted by the same reference numerals, and description thereof may be omitted. In the descriptions herein, the X-axis direction, the Y-axis direction, and the Z-axis direction are perpendicular to each other. The X-axis direction and the Y-axis direction are the horizontal directions, and the Z-axis direction is the vertical direction.

Figure 2:
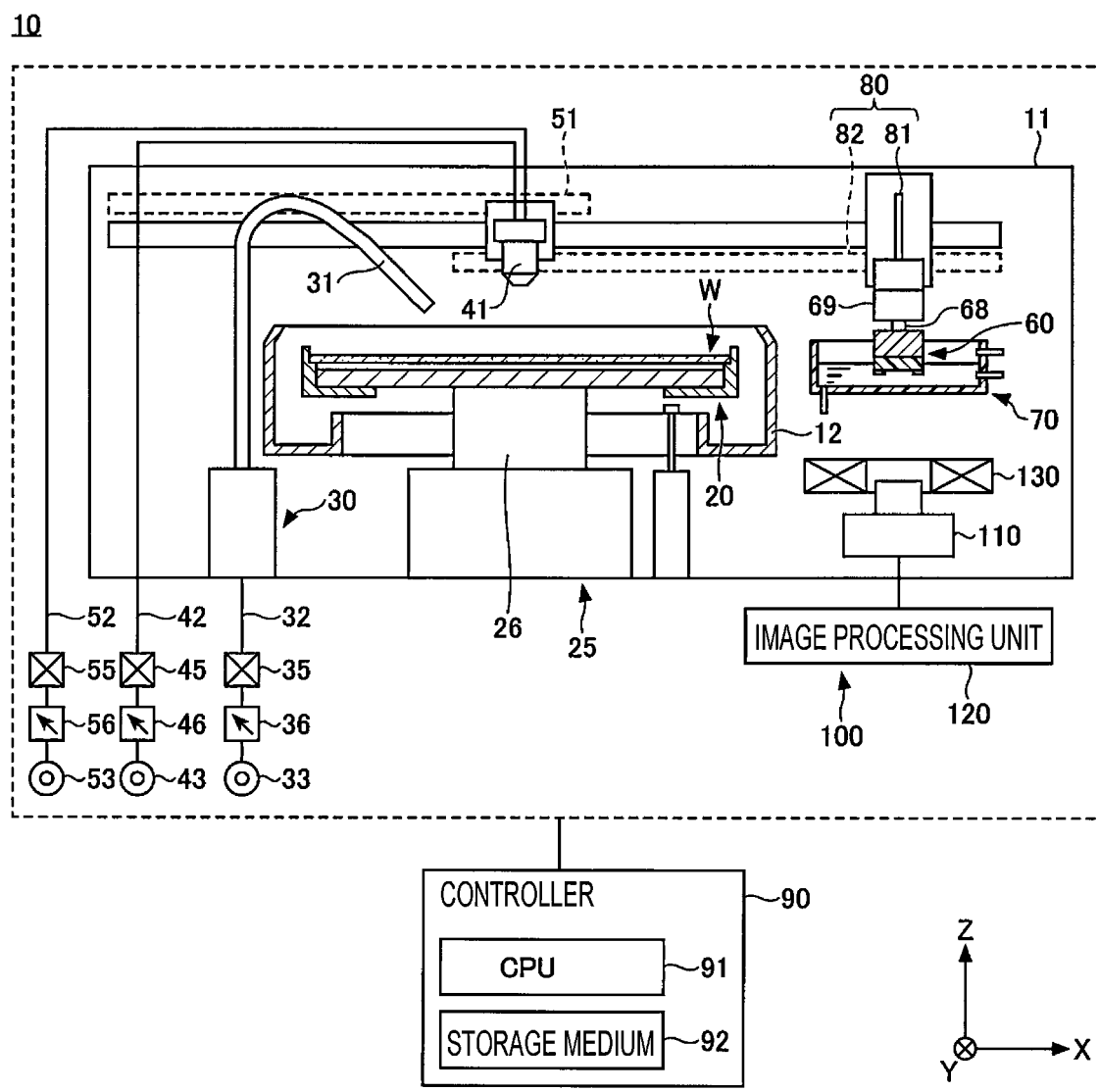
FIG. 2 is a cross-sectional view illustrating a state of the substrate processing apparatus in FIG. 1 at the time of cleaning.

As illustrated in FIGS. 1 and 2, a substrate processing apparatus 10 includes a case 11, a cup 12, a holder 20, a rotating unit 25, a liquid supply 30, a polishing head 60, a pod 70, a moving unit 80, and a controller 90. The case 11 includes a processing chamber in which a substrate W is processed therein. The cup 12 collects a cleaning liquid that is shaken off from the substrate W. The holder 20 holds the substrate W horizontally. The rotating unit 25 rotates the holder 20 so as to rotate the substrate W together with the holder 20. The liquid supply 30 supplies a cleaning liquid onto the substrate W. The polishing head 60 includes a polishing pad 61 (see FIGS. 3A and 3B) that polishes the substrate W. The pod 70 accommodates a polishing surface 62 of the polishing pad 61, which is brought into contact with the substrate W. The moving unit 80 presses the polishing head 60 against the substrate W and scans in the radial direction of the substrate W with the polishing head 60. The controller 90 controls the rotating unit 25, the liquid supply 30, and the moving unit 80. Hereinafter, respective configurations will be described.

The holder 20 holds the substrate W horizontally. The substrate W includes a semiconductor substrate such as a silicon wafer or a compound semiconductor wafer. The substrate W may further include a dielectric film or a conductive film formed on the semiconductor substrate. Further, the substrate W may include a glass substrate instead of the semiconductor substrate. The holder 20 holds the substrate W horizontally. The holder 20 is, for example, a mechanical chuck that holds the outer circumference of the substrate W. However, the holder 20 may be a vacuum chuck or an electrostatic chuck, or may hold the lower surface of the substrate W.

The rotating unit 25 is, for example, a rotary motor, and rotates the holder 20 around a vertical rotary shaft 26. The rotating unit 25 rotates the holder 20 while the substrate W is held by the holder 20. Therefore, the substrate W is rotated.

The liquid supply 30 supplies a cleaning liquid to the upper surface of the substrate W while the substrate W is held by the holder 20. For example, deionized water (DIW) is used as the cleaning liquid. A plurality of cleaning liquids may be used, and a chemical liquid and a rinse liquid may be used in order as the cleaning liquid. The liquid supply 30 includes, for example, a first nozzle 31 and a second nozzle 41.

The first nozzle 31 supplies the cleaning liquid to the center of the upper surface of the substrate W during the rotation of the substrate W. The cleaning liquid spreads over the entire upper surface of the substrate W by the centrifugal force, and is shaken off at the peripheral edge of the substrate W. The first nozzle 31 is connected to a liquid supply source 33 via a pipe 32. An opening/closing valve 35 and a flow rate controller 36 are provided in the middle of the pipe 32. When the opening/closing valve 35 opens the flow path of the pipe 32, the cleaning liquid is supplied from the liquid supply source 33 to the first nozzle 31, and ejected from the first nozzle 31. The ejection amount is controlled by the flow rate controller 36. Meanwhile, when the opening/closing valve 35 closes the flow path of the pipe 32, the supply of the cleaning liquid from the liquid supply source 33 to the first nozzle 31 is stopped, and the ejection of the cleaning liquid is stopped.

The second nozzle 41 is moved in the radial direction of the substrate W during the rotation of the substrate W, and supplies the cleaning liquid over the entire upper surface of the substrate W in the radial direction. The liquid supply 30 includes a moving device 51 that moves the second nozzle 41 in the radial direction of the substrate W. The second nozzle 41 is, for example, a two-fluid nozzle, and pulverizes, atomizes, and sprays the cleaning liquid with a gas such as N2 gas. The cleaning power of the cleaning liquid may be improved.

Similarly to the first nozzle 31, the second nozzle 41 is connected to a liquid supply source 43 via a pipe 42. An opening/closing valve 45 and a flow rate controller 46 are provided in the middle of the pipe 42. Further, the second nozzle 41 is connected to a gas supply source 53 via a pipe 52. An opening/closing valve 55 and a flow rate controller 56 are provided in the middle of the pipe 52. When the opening/closing valve 55 opens the flow path of the pipe 52, a gas is supplied from the gas supply source 53 to the second nozzle 41, and ejected from the second nozzle 41. The ejection amount is controlled by the flow rate controller 56. Meanwhile, when the opening/closing valve 55 closes the flow path of the pipe 52, the supply of the gas from the gas supply source 53 to the second nozzle 41 is stopped, and the ejection of the gas is stopped.

The various types of fluids ejected from the liquid supply 30 are collected in the cup 12. The cup 12 accommodates the holder 20 and the substrate W in a state of being held by the holder 20 therein, and collects the droplets shaken off from the substrate W. A drain pipe and an exhaust pipe (not illustrated) are provided in the bottom wall of the cup 12. The drain pipe ejects the cleaning liquid, and the exhaust pipe ejects the gas.

As illustrated in FIG. 1, the polishing head 60 is brought into contact with the upper surface of the substrate W and polishes the upper surface of the substrate W while the substrate W is held by the holder 20. The polishing head 60 polishes the upper surface of the substrate W in the embodiment, but may polish the lower surface of the substrate W. When the polishing head 60 polishes the lower surface of the substrate W, the liquid supply 30 may supply the cleaning liquid to the lower surface of the substrate W.

The polishing head 60 is connected to a rotary motor 69 via a vertical rotary shaft 68. The rotary motor 69 rotates the polishing head 60 around the rotary shaft 68. A transmission member that configured to transmit the rotational force (torque) of the rotary motor 69 to the rotary shaft 68 may be disposed between the rotary motor 69 and the rotary shaft 68. The transmission member includes, for example, a belt and a pulley.

Figure 3A:
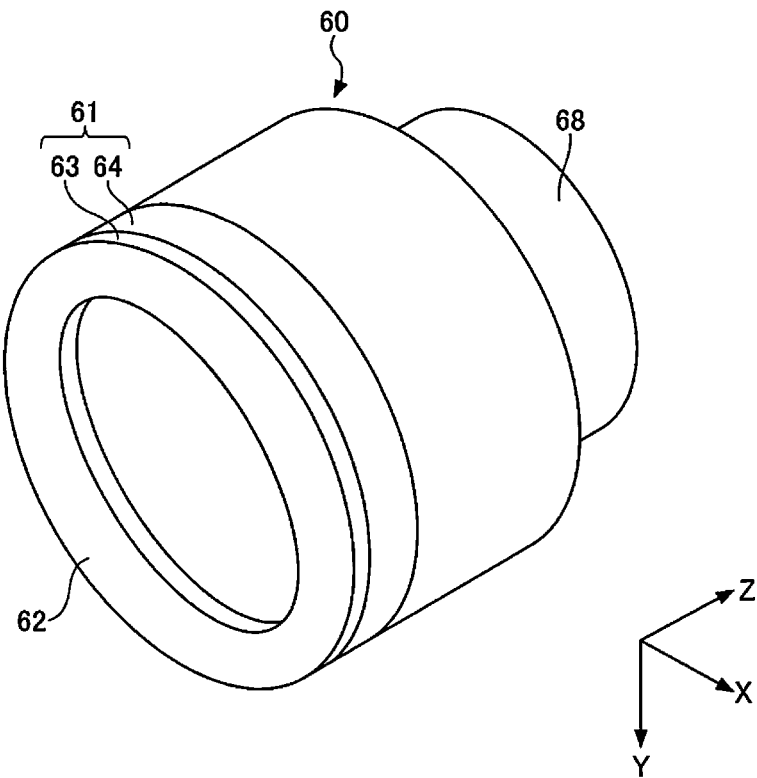
FIG. 3A is a perspective view illustrating an example of a polishing head.
Figure 3B:
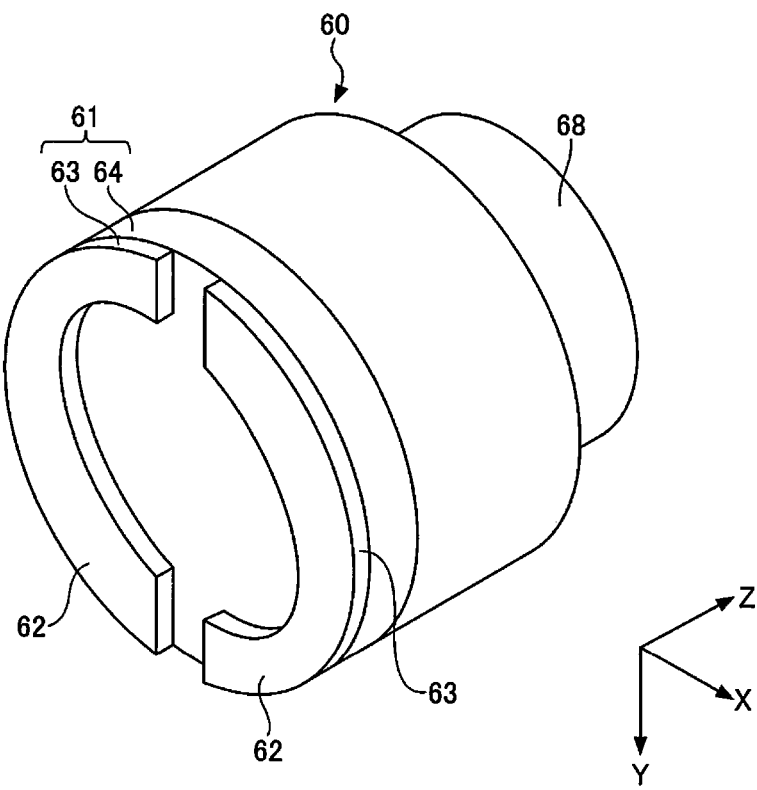
FIG. 3B is a perspective view illustrating another example of the polishing head.

As illustrated in FIGS. 3A and 3B, the polishing head 60 includes the polishing pad 61 that polishes the substrate W. The polishing pad 61 includes the polishing surface 62 that is brought into contact with the substrate W. The polishing pad 61 includes, for example, a sheet 63 that forms the polishing surface 62, and a base material 64 to which the sheet 63 is attached.

The base material 64 is made of, for example, a resin. The material of the base material is a hard resin, for example, polyvinyl chloride (PVC). The base material 64 is, for example, a columnar shape.

Meanwhile, the sheet 63 may have a circular shape as illustrated in FIG. 3A, or an arc shape as illustrated in FIG. 3B. A plurality of arc-shaped sheets 63 may be provided at intervals along the outer circumference of the base material 64, or grooves may be formed between the adjacent sheets 63. The number of the sheets 63 is not limited to two, and may be one, or three or more. The sheet 63 includes polishing particles. The polishing particles are, for example, diamond particles or silicon carbide particles.

The sheet 63 includes, for example, a polishing material layer in which polishing particles are hardened with a resin, and a resin film that supports the polishing material layer. The polishing material layer may have an uneven pattern on the polishing surface 62 in order to suppress clogging, and may have, for example, a striped groove on the polishing surface 62.

The structure of the polishing pad 61 is not limited to the structure illustrated in FIGS. 3A and 3B. For example, the polishing head 60 may not include the sheet 63, but may include only the columnar body containing a hard resin. The material of the columnar body is, for example, polyether ether ketone (PEEK). The polishing surface 62 of the columnar body may not have an uneven pattern, but may be a flat surface.

Figure 5:
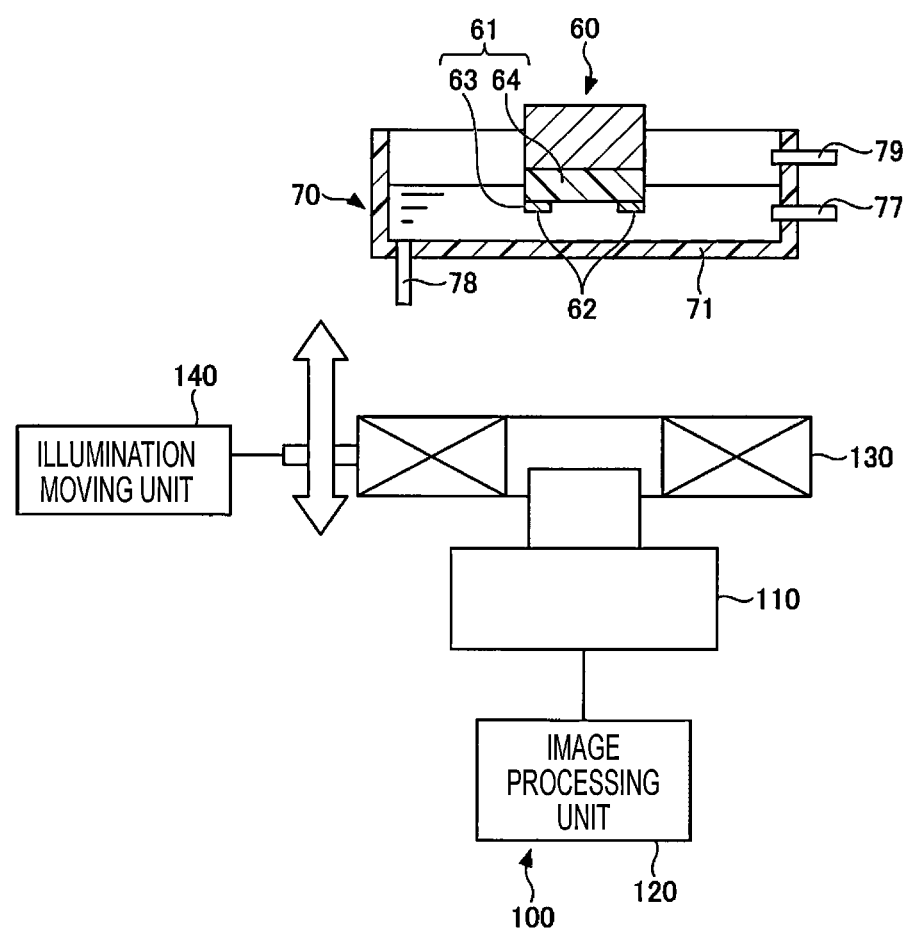
FIG. 5 is a cross-sectional view illustrating a polishing pad inspecting device according to an embodiment.

As illustrated in FIGS. 1 and 2, the pod 70 is provided outside the cup 12. As illustrated in FIG. 5, the pod 70 accommodates the polishing surface 62 of the polishing pad 61. The pod 70 is, for example, a bath that stores the cleaning liquid. The polishing surface 62 may be cleaned by the cleaning liquid, and thus, dirt attached to the polishing surface 62 may be removed.

The bath may be provided with a supply pipe 77 that supplies the cleaning liquid, and a discharge pipe 78 that discharges the cleaning liquid. The supply pipe 77 and the discharge pipe 78 may form a flow of the cleaning liquid inside the bath, and the dirt attached to the polishing surface 62 may be effectively removed by the flow of the cleaning liquid. The cleaning liquid discharged from the discharge pipe 78 may pass through a filter, and then, may be returned to the supply pipe 77. That is, the cleaning liquid may be circulated.

As illustrated in FIGS. 1 and 2, the moving unit 80 moves the polishing head 60 between the pod 70 and the substrate W held by the holder 20. The moving unit 80 includes, for example, a first moving unit 81 and a second moving unit 82. The first moving unit 81 moves the polishing head 60 in the Z-axis direction to press against the substrate W. Further, the second moving unit 82 moves the polishing head 60 in the X-axis direction to scan in the radial direction of the substrate W.

The controller 90 is, for example, a computer, and includes a central processing unit (CPU) 91 and a storage medium 92 such as a memory. The storage medium 92 stores a program that controls various processings executed in the substrate processing apparatus 10. The controller 90 controls the operation of the substrate processing apparatus 10 by causing the CPU 91 to execute the programs stored in the storage medium 92.

Figure 4:
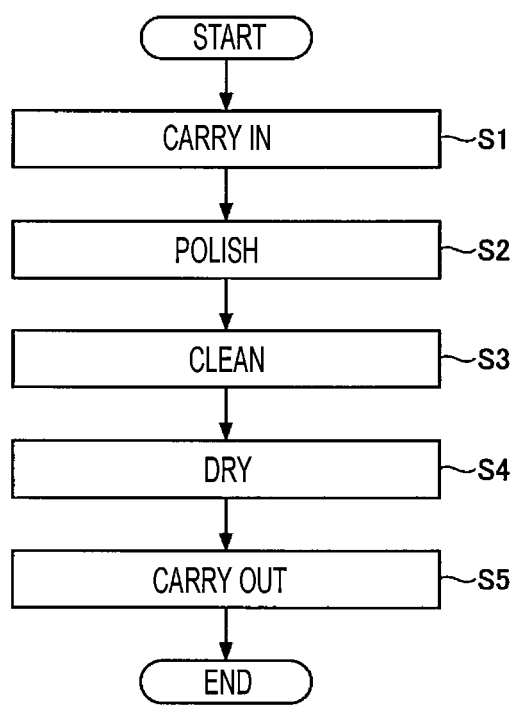
FIG. 4 is a flowchart illustrating a substrate processing method according to an embodiment.

Next, the operation of the substrate processing apparatus 10, that is, the substrate processing method will be described with reference to FIG. 4 and others. As illustrated in FIG. 4, the substrate processing method includes steps S1 to S5. The steps S1 to S5 are performed under the control of the controller 90.

In step S1, a transfer device (not illustrated) carries the substrate W into the case 11, and transmits to the holder 20. The holder 20 holds the substrate W horizontally. The transfer device transmits the substrate W to the holder 20, and then, is retracted outside the case 11. After step S1, the moving unit 80 takes out the polishing head 60 from the pod 70, and moves toward the substrate W held by the holder 20.

In step S2, the substrate W is polished by the polishing head 60 while the substrate W is held by the holder 20. For example, the moving unit 80 presses the polishing head 60 against the substrate W and scans in the radial direction of the substrate W. The polishing head 60 may scan one time or a plurality of times. Further, the rotating unit 25 rotates the holder 20 so as to rotate the substrate W together with the holder 20. Further, the rotary motor 69 rotates the polishing head 60. Further, the liquid supply 30 supplies the cleaning liquid to the upper surface of the substrate W, and a liquid film of the cleaning liquid is formed between the polishing head 60 and the substrate W.

The controller 90 controls the moving unit 80 so as to control the polishing pressure of the polishing head 60 and the scan speed of the polishing head 60. Further, the controller 90 controls the rotating unit 25 so as to control the rotational speed of the substrate W. Further, the controller 90 controls the rotary motor 69 so as to control the rotation speed of the polishing head 60. Further, the controller 90 controls the liquid supply 30 so as to control the thickness of the liquid film formed between the polishing head 60 and the substrate W. After step S2, the moving unit 80 separates the polishing head 60 from the substrate W held by the holder 20, and moves the polishing head 60 toward the pod 70.

In step S3, the liquid supply 30 supplies the cleaning liquid to the substrate W to wash away dirt such as polishing debris. For example, first, the first nozzle 31 supplies the cleaning liquid to the center of the upper surface of the substrate W. The cleaning liquid spreads over the entire upper surface by the centrifugal force, and thus, the dirt separated from the substrate W is flown outward in the radial direction of the substrate W. For example, a rinse liquid such as DIW is used as the cleaning liquid. A chemical liquid and a rinse liquid may be used in order as the cleaning liquid.

Next, the second nozzle 41 gradually moves from the position directly above the center of the substrate W to the position directly above the peripheral edge of the substrate W while the cleaning liquid is ejected toward the upper surface of the substrate W, and stops for a set time at the position directly above the peripheral edge of the substrate W. This is because the dirt is easily attached to the peripheral edge of the substrate W. The movement direction of the second nozzle 41 is outward in the radial direction of the substrate W in the embodiment, but may be inward in the radial direction of the substrate W. Further, the second nozzle 41 scans one time in the embodiment, but may scan a plurality of times.

In step S4, the substrate W is dried. For example, the rotating unit 25 rotates the holder 20 at a high speed to shake off the cleaning liquid remaining on the substrate W. At the end of step S3, the liquid film of the rinse liquid may be replaced with a liquid film of a drying liquid having a surface tension smaller than that of the rinse liquid. In this case, in step S4, the drying liquid is shaken off. For example, isopropyl alcohol (IPA) is used as the drying liquid.

In step S5, the transfer device (not illustrated) enters the inside of the case 11, receives the substrate W from the holder 20, and carries the substrate W out of the case 11. Then, this processing ends.

Next, a polishing pad inspecting device provided in the substrate processing apparatus 10 according to the embodiment will be described with reference to FIG. 5. A polishing pad inspecting device 100 includes an imaging unit 110 that images the polishing surface 62 of the polishing pad 61 through the pod 70, and an image processing unit 120 that processes image data imaged by the imaging unit 110 to detect deterioration of the polishing pad 61. The deterioration of the polishing pad 61 includes, for example, abrasion of the polishing pad 61, and peeling between the sheet 63 and the base material 64.

In the related art, the replacement time of the polishing pad 61 is managed by the number of substrates W polished by the polishing pad 61. However, the abrasion rate of the polishing pad 61 is changed depending on the material of the substrate surface, and the polishing conditions such as polishing pressure. Further, an abnormality such as the peeling between the sheet 63 and the base material 64 may occur accidentally. Therefore, in the related art, the replacement time of the polishing pad 61 has been set early with a safety margin.

According to the embodiment, the polishing surface 62 of the polishing pad 61 is imaged, and the image data obtained by imaging is processed to detect the deterioration of the polishing pad 61. Therefore, the polishing pad 61 may be used up to the life limit. Thus, the polishing pad 61 may be effectively used. Further, the replacement time of the polishing pad 61 may be delayed. Thus, the replacement frequency of the polishing pad 61 may be reduced, and the operating rate of the substrate processing apparatus 10 may be improved. When the deterioration of the polishing pad 61 is detected, the image processing unit 120 may notify the user of the substrate processing apparatus 10 of the deterioration of the polishing pad 61 by an image or sound.

Further, according to the embodiment, the polishing surface 62 of the polishing pad 61 is imaged through the pod 70. Since the polishing surface 62 is imaged while the polishing surface 62 of the polishing pad 61 is accommodated in the pod 70, the polishing pad 61 may be inspected when the polishing pad 61 is not used. For example, the polishing pad 61 may be inspected during the idling of the substrate processing apparatus 10. When the polishing pad 61 is deteriorated, the polishing pad 61 may be replaced while the substrate processing apparatus 10 is idling, and thus, the operating rate of the substrate processing apparatus 10 may be improved.

The pod 70 includes, for example, a transparent wall 71 that faces the polishing surface 62 of the polishing pad 61. The transparent wall 71 transmits, for example, visible light. The visible light transmittance of the transparent wall 71 is, for example, 90% or more and 100% or less. The material of the transparent wall 71 is, for example, a resin such as an acrylic resin, or glass.

The imaging unit 110 is, for example, a CCD camera or a CMOS camera. The frame rate and gain of the camera are set appropriately. The imaging unit 110 images the polishing surface 62 of the polishing pad 61 through the transparent wall 71 of the pod 70. A clear image of the polishing surface 62 may be acquired, so that the deterioration of the polishing pad 61 may be accurately detected.

When the pod 70 is a bath that stores the cleaning liquid, the bottom wall of the bath is the transparent wall 71. The dirt attached to the polishing surface 62 of the polishing pad 61 may be removed by the cleaning liquid stored in the bath. Therefore, the polishing surface 62 may be imaged after the dirt on the polishing surface 62 is shaken off. Therefore, a clear image of the polishing surface 62 may be acquired, so that the deterioration of the polishing pad 61 may be accurately detected.

The imaging unit 110 may image the polishing surface 62 of the polishing pad 61 while the cleaning liquid is stored in the bath. It is possible to save effort to empty the bath or to store the cleaning liquid in the bath again. During the imaging of the polishing surface 62, the controller 90 may stop the supply of the cleaning liquid by the supply pipe 77 and the discharge of the cleaning liquid by the discharge pipe 78 so as to stop the flow of the cleaning liquid inside the bath. It is possible to suppress image distortion due to the flow of the cleaning liquid.

The substrate processing apparatus 10 may include a nozzle 79 that supplies a gas into the pod 70. The cleaning liquid attached to the polishing surface 62 of the polishing pad 61 is blown away by the nozzle 79 so that the polishing surface 62 may be dried. The polishing surface 62 may be imaged after the droplets attached to the polishing surface 62 is shaken off. Therefore, a clear image of the polishing surface 62 may be acquired, so that the deterioration of the polishing pad 61 may be accurately detected. In this case, before the polishing surface 62 is imaged, the controller 90 may stop the supply of the cleaning liquid by the supply pipe 77 and discharge the cleaning liquid by the discharge pipe 78 to empty the inside of the bath.

When the polishing head 60 polishes the lower surface of the substrate W, the upper surface of the polishing pad 61 becomes the polishing surface 62. In this case, the transparent wall 71 of the pod 70 is provided above the polishing pad 61, and the imaging unit 110 is provided above the transparent wall 71 of the pod 70.

The polishing pad inspecting device 100 includes an illuminating unit 130 that irradiates light to the polishing surface 62 of the polishing pad 61. The illuminating unit 130 includes a light source such as an LED. By irradiating the polishing surface 62 with light, the imaging unit 110 may receive the reflected light that is specularly reflected by the polishing surface 62, or the scattered light that is scattered by the polishing surface 62. The illuminating unit 130 irradiates the polishing surface 62 with light, for example, visible light. The intensity of the light irradiated by the illuminating unit 130 to the polishing surface 62 is appropriately set.

Figure 6A:
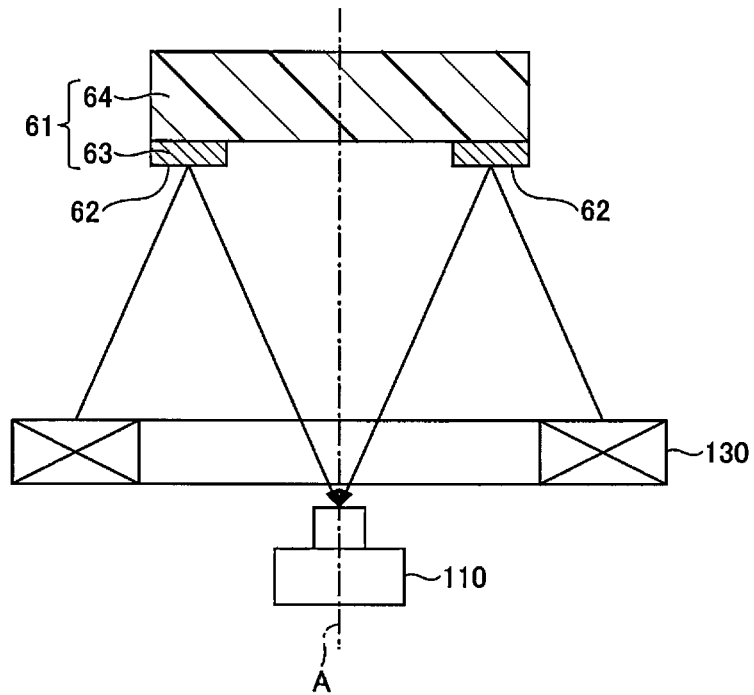
FIG. 6A is a cross-sectional view illustrating an example of a position of an illuminating unit at the time of imaging a bright-field image.
Figure 6B:
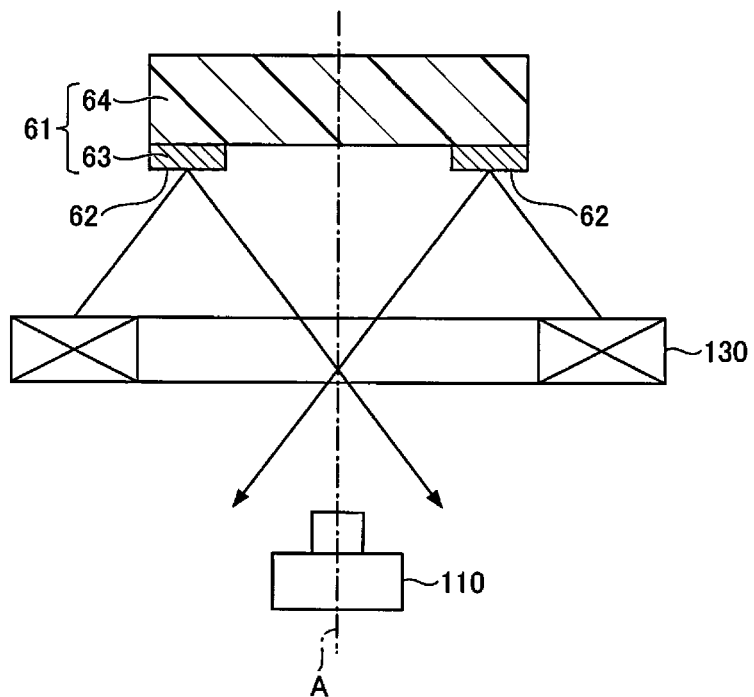
FIG. 6B is a cross-sectional view illustrating an example of a position of the illuminating unit at the time of imaging a dark-field image.

The polishing pad inspecting device 100 includes an illumination moving unit 140 that moves the illuminating unit 130 along an optical axis A of the imaging unit 110 (see FIGS. 6A and 6B). The incident angle of the light with respect to the polishing surface 62 of the polishing pad 61 may be changed by moving the illuminating unit 130, and thus, an appropriate image may be acquired. For example, a bright-field image and a dark-field image may be acquired.

As illustrated by arrows in FIG. 6A, the bright-field image is an image acquired by receiving a reflected light by the imaging unit 110, which is irradiated by the illuminating unit 130 to the polishing surface 62 and specularly reflected by the polishing surface 62. The bright-field image may brighten the entire field of view and is suitable for acquiring information on the brightness and the color.

Meanwhile, as illustrated by arrows in FIG. 6B, the dark-field image is an image acquired by receiving a scattered light scattered by the polishing surface 62 by the imaging unit 110, without receiving the reflected light which is irradiated by the illuminating unit 130 to the polishing surface 62 and specularly reflected by the polishing surface 62. The dark-field image is suitable for observing a fine uneven pattern because it is easy to obtain high contrast.

The illuminating unit 130 is formed, for example, in an annular shape so as to surround the optical axis A of the imaging unit 110. The optical axis A of the imaging unit 110 and the rotation center line of the polishing head 60 are disposed, for example, on the same straight line. Since the illuminating unit 130 is formed in the annular shape, it is possible to uniformly irradiate the entire circumferential direction of the polishing surface 62 with light. The illuminating unit 130 is formed in a circular annular shape, but may be formed in a square annular shape by combining a plurality of rod-shaped light sources.

The inner diameter of the illuminating unit 130 may be larger than the outer diameter of at least a part of the imaging unit 110. The movable range of the illuminating unit 130 may be widened. The inner diameter of the illuminating unit 130 may be larger than the outer diameter of the entire imaging unit 110, and the illuminating unit 130 may be disposed below the imaging unit 110.

Figure 7:
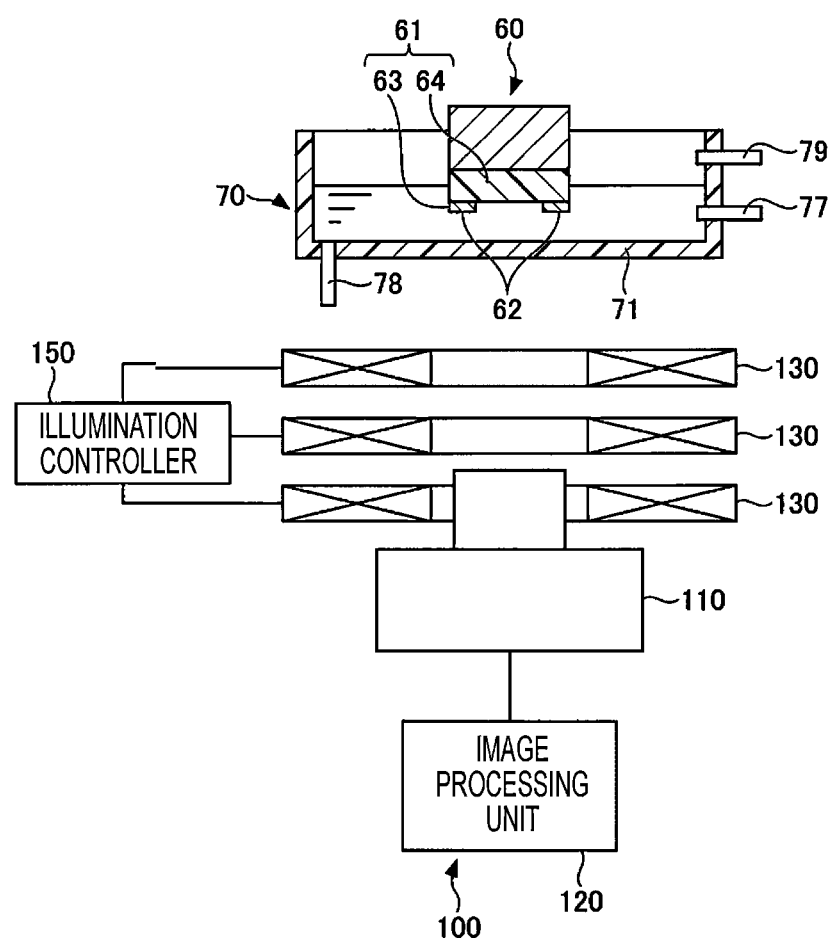
FIG. 7 is a cross-sectional view illustrating a polishing pad inspecting device according to a modification.

As illustrated in FIG. 7, a plurality of illuminating units 130 may be provided at intervals along the optical axis A of the imaging unit 110. In this case, the polishing pad inspecting device 100 includes an illumination controller 150 that individually operates the plurality of illuminating units 130. The incident angle of the light with respect to the polishing surface 62 of the polishing pad 61 may be changed by switching the illuminating unit 130 used at the time of imaging, and thus, an appropriate image may be acquired. For example, a bright-field image and a dark-field image may be acquired.

The image processing unit 120 is, for example, a computer. The image processing unit 120 may be common to a plurality of substrate processing apparatuses 10, and may process image data imaged by a plurality of imaging units 110. The number of the image processing units 120 may be reduced. The imaging unit 110 is provided for each substrate processing apparatus 10.

Figure 8:
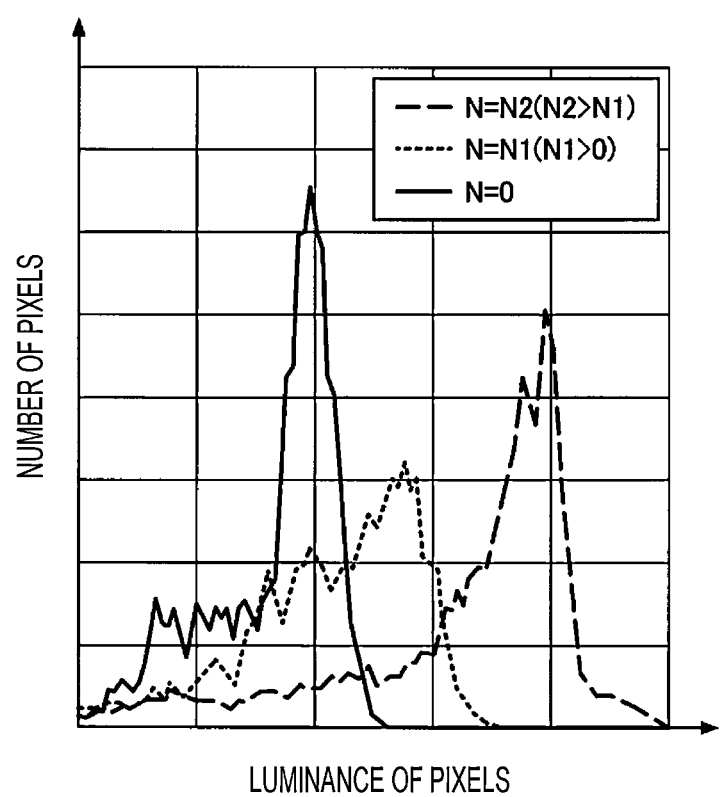
FIG. 8 is a graph illustrating an example of a relationship between the number N of the substrates polished by a polishing pad, and a probability distribution of the luminance of image data obtained by imaging a polishing surface of the polishing pad.

FIG. 8 illustrates an example of a relationship between the number N of the substrates W polished by the polishing pad 61, and a probability distribution of a luminance of the image data obtained by imaging the polishing surface 62 of the polishing pad 61. In FIG. 8, the horizontal axis represents the luminance of pixels, and the vertical axis represents the number of pixels, that is, the probability. When the number N of the substrates W polished by the polishing pad 61 is increased, it represents that the abrasion is progressing, and the degree of the abrasion is large.

As is clear from FIG. 8, as the number N increases, that is, as the abrasion progresses, the luminance having the highest probability is shifted to a higher luminance. This is because, as the abrasion of the polishing pad 61 progresses, the polishing particles are fallen off or the uneven pattern is worn, and thus, the surface roughness of the polishing surface 62 becomes small, and light is more likely to be reflected by the polishing surface 62.

Therefore, the image processing unit 120 may detect the abrasion of the polishing surface 62 from, for example, the probability distribution of the luminance of the image data. The bright-field image is suitable for inspecting the probability distribution of the luminance. The relationship between the probability distribution of the luminance of the image data and the degree of the abrasion of the polishing surface 62, which is investigated in advance and is stored in a storage medium such as a memory, is read out and used.

The image processing unit 120 detects the abrasion of the polishing surface 62 by, for example, detecting the luminance having the highest probability. As the abrasion of the polishing pad 61 progresses, the luminance having the highest probability is shifted to a higher luminance. The image processing unit 120 determines that the degree of the abrasion of the polishing surface 62 exceeds the usage limit when the luminance having the highest probability exceeds a preset luminance. The image processing unit 120 may gradually detect the degree of the abrasion of the polishing surface 62, and may gradually change the contents of the notification to the user.

The polishing surface 62 according to the embodiment includes abrasive grains and also includes the uneven pattern, but the technique of the present disclosure is not limited thereto. As described above, the polishing surface 62 may be a flat surface in an unused state. In this case, as the abrasion of the polishing surface 62 progresses, the surface roughness of the polishing surface 62 increases, and thus, light is easily scattered by the polishing surface 62. Therefore, the image processing unit 120 may determine that the degree of the abrasion of the polishing surface 62 exceeds the usage limit when the luminance having the highest probability is below a preset luminance.

Figure 9A:
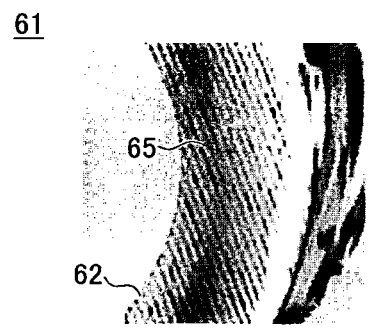
FIG. 9A is a view illustrating an example of an image obtained by imaging a polishing surface of a polishing pad in which the number N is zero.
Figure 9B:
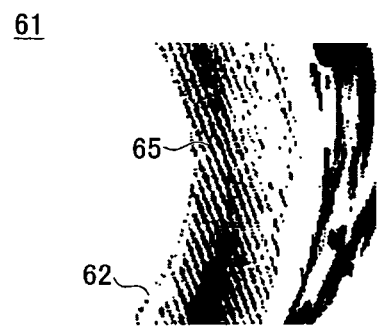
FIG. 9B is a view illustrating an example of an image obtained by binarizing the drawing in FIG. 9A.
Figure 9C:
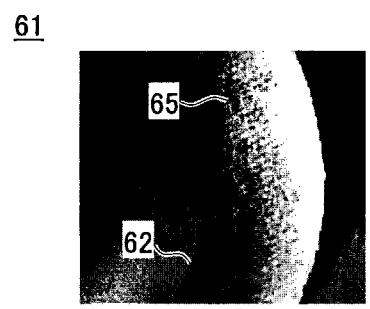
FIG. 9C is a view illustrating an example of an image obtained by imaging a polishing surface of a polishing pad in which the number N is N2.
Figure 9D:
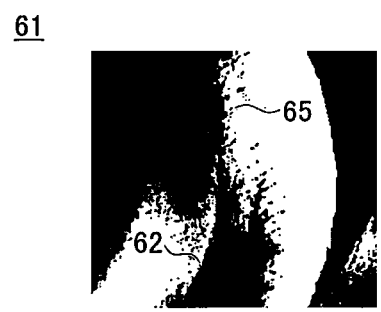
FIG. 9D is a view illustrating an example of an image obtained by binarizing the drawing in FIG. 9C.

FIG. 9A is a view illustrating an example of an image obtained by imaging the polishing surface 62 of the polishing pad 61 in which the number N is zero, and FIG. 9B is a view illustrating an example of an image obtained by binarizing the drawing in FIG. 9A. Further, FIG. 9C is a view illustrating an example of an image obtained by imaging the polishing surface 62 of the polishing pad 61 in which the number N is N2 (N2>0), and FIG. 9D is a view illustrating an example of an image obtained by binarizing the drawing in FIG. 9C.

As is clear from FIGS. 9A to 9D, when the polishing surface 62 of the polishing pad 61 includes a linear groove 65 in an unused state, as the number N increases, that is, the abrasion progresses, the groove 65 extracted from the image data becomes unclear, and the clarity of the groove 65 decreases. This is because, as the abrasion of the polishing pad 61 progresses, the abrasion of the groove 65 progresses.

Therefore, when the polishing surface 62 of the polishing pad 61 includes the linear groove 65 in an unused state, the image processing unit 120 may detect the abrasion of the polishing surface 62 from the clarity of the groove 65 extracted from the image data. The dark-field image is suitable for inspecting the clarity of the groove 65. The relationship between the clarity of the groove 65 and the degree of the abrasion of the polishing surface 62, which is investigated in advance and is stored in a storage medium such as a memory, is read out and used.

The image processing unit 120 extracts the groove 65 from the image data by, for example, the binarization processing, pattern recognition, or template matching, so as to obtain the clarity of the groove 65. The clarity of the groove 65 is expressed by the size of the groove 65, for example, the length, the width, or the area (product of length and width) of the groove 65. As the size of the groove 65 is small, the clarity of the groove 65 is low, and the degree of the abrasion is high.

The image processing unit 120 may determine that the degree of the abrasion of the polishing surface 62 exceeds the usage limit when the clarity of the groove 65, that is, the size of the groove 65 is below a preset value. The image processing unit 120 may gradually detect the degree of the abrasion of the polishing surface 62, and may gradually change the contents of the notification to the user.

The polishing surface 62 according to the embodiment includes the linear groove 65 in an unused state, but the technique of the present disclosure is not limited thereto. As described above, the polishing surface 62 may be a flat surface in an unused state. In this case, as the abrasion of the polishing surface 62 progresses, the polishing surface 62 is easily damaged. Therefore, the image processing unit 120 extracts scratches from the image data, and may extract the abrasion of the polishing surface 62 from the size or the number of the scratches.

However, the sheet 63 and the base material 64 may be peeled off from each other. Further, after and before the peeling, the color included in the image data may be changed. This is because, when the sheet 63 and the base material 64 are peeled off from each other, the adhesive that adheres the sheet 63 and the base material 64 with each other, or the base material 64 is exposed. The surface of the base material 64 may be distinguished by a color between the area to which the sheet 63 is attached and the peripheral area around that area.

Therefore, when the polishing pad 61 includes the sheet 63 and the base material 64, the image processing unit 120 may detect the peeling between the sheet 63 and the base material 64 from the color data included in the image data.

According to an aspect of the present disclosure, it is possible to inspect the polishing surface of the polishing pad that polishes the substrate at an appropriate timing, and thus, the operating rate of the substrate processing apparatus may be improved.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A substrate processing apparatus comprising:
a polishing pad configured to polish a substrate;
a pod configured to accommodate a polishing surface of the polishing pad, which is brought into contact with the substrate;
a moving unit configured to move the polishing pad between the pod and the substrate held by a holder;
a camera configured to image the polishing surface of the polishing pad through the pod;
an image processor configured to process image data imaged by the camera, and detect deterioration of the polishing pad;
an illuminator including a light source and configured to irradiate light to the polishing surface of the polishing pad; and
an illuminating actuator configured to move the illuminator to change an incident angle of the light with respect to the polishing surface of the polishing pad,
wherein when the polishing pad is inspected, the polishing pad is moved from the substrate held by the holder to the pod by the moving unit, and
wherein when the deterioration of the polishing pad is detected, the image processor is configured to notify a user of a polishing pad inspecting device of the deterioration of the polishing pad, such that the polishing pad is used up to a life limit.

2. The substrate processing apparatus according to claim 1, wherein the image processor detects a degree of abrasion of the polishing surface from a probability distribution of a luminance of the image data.

3. The substrate processing apparatus according to claim 1, wherein the polishing surface of the polishing pad includes a linear groove; and
the image processor detects the degree of abrasion of the polishing surface from a level of clarity of the groove extracted from the image data.

4. The substrate processing apparatus according to claim 1, wherein the polishing pad includes a sheet that forms the polishing surface, and a base to which the sheet is attached; and
the image processor detects a peeling between the sheet and the base from color data included in the image data.

5. The substrate processing apparatus according to claim 1, further comprising:
an irradiation source configured to irradiate light to the polishing surface of the polishing pad.

6. The substrate processing apparatus according to claim 5, further comprising:
an irradiation source guide configured to move the irradiation source along an optical axis of the camera.

7. The substrate processing apparatus according to claim 5, wherein a plurality of irradiation sources is provided at intervals along an optical axis of the camera; and
an irradiation controller is provided to individually operate the plurality of irradiation sources.

8. The substrate processing apparatus according to claim 5, wherein the irradiation source is formed in an annular shape so as to surround an optical axis of the camera.

9. The substrate processing apparatus according to claim 1, wherein the pod includes a transparent wall facing the polishing surface of the polishing pad; and
the camera images the polishing surface of the polishing pad through the transparent wall of the pod.

10. The substrate processing apparatus according to claim 9, wherein the pod is a bath that stores a cleaning liquid for cleaning the polishing surface of the polishing pad; and
the transparent wall is a bottom wall of the bath.

11. The substrate processing apparatus according to claim 10, wherein the camera images the polishing surface of the polishing pad while the cleaning liquid is stored in the bath.

12. The substrate processing apparatus according to claim 10, further comprising:
a supply pipe configured to supply the cleaning liquid into the bath; and
a discharge pipe configured to discharge the cleaning liquid from an inside of the bath.

13. The substrate processing apparatus according to claim 1, further comprising:
a nozzle configured to supply a gas into the pod.

14. A polishing pad inspecting device comprising:
a camera configured to image a polishing surface of a polishing pad that contacts and polishes a substrate, through a pod that accommodates the polishing surface of the polishing pad;
an image processor configured to process image data imaged by the camera to detect a degree of deterioration of the polishing pad;
an illuminator including a light source, configured to irradiate light to the polishing surface of the polishing pad; and
an illuminating actuator configured to move the illuminator to change an incident angle of the light with respect to the polishing surface of the polishing pad,
wherein when the polishing pad is inspected, the polishing pad is moved from the substrate held by a holder to the pod by a moving unit, and
wherein when the deterioration of the polishing pad is detected, the image processor is configured to notify a user of the polishing pad inspecting device of the deterioration of the polishing pad, such that the polishing pad is used up to a life limit.

15. A method for inspecting a polishing pad that polishes a substrate, the method comprising:
irradiating light, by an illuminator, to a polishing surface of the polishing pad;
changing an incident angle of the light, by an illuminating actuator, with respect to the polishing surface of the polishing pad;
imaging the polishing surface of the polishing pad that contacts and polishes the substrate, by a camera, through a pod that accommodates the polishing surface of the polishing pad; and
processing image data imaged in the imaging, by an image processor, to detect a degree of deterioration of the polishing pad,
wherein when the polishing pad is inspected, the polishing pad is moved from the substrate held by a holder to the pod by a moving unit, and
wherein when the deterioration of the polishing pad is detected, the image processor is configured to notify a user of a polishing pad inspecting device of the deterioration of the polishing pad, such that the polishing pad is used up to a life limit.

* * * * *